(12) United States Patent
Jonishi et al.

(10) Patent No.: US 10,436,917 B2
(45) Date of Patent: Oct. 8, 2019

(54) RADIATION DETECTOR AND SCINTILLATOR PANEL

(71) Applicant: HAMAMATSU PHOTONICS K.K., Hamamatsu-shi, Shizuoka (JP)

(72) Inventors: Hidenori Jonishi, Hamamatsu (JP); Yutaka Kusuyama, Hamamatsu (JP); Hirotake Osawa, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/089,404

(22) PCT Filed: Jan. 26, 2017

(86) PCT No.: PCT/JP2017/002755
§ 371 (c)(1),
(2) Date: Sep. 28, 2018

(87) PCT Pub. No.: WO2017/169049
PCT Pub. Date: Oct. 5, 2017

(65) Prior Publication Data
US 2019/0107634 A1      Apr. 11, 2019

(30) Foreign Application Priority Data

Mar. 30, 2016 (JP) ................................. 2016-068611

(51) Int. Cl.
*G01T 1/20* (2006.01)
*G01T 1/202* (2006.01)

(52) U.S. Cl.
CPC ............... *G01T 1/202* (2013.01); *G01T 1/20* (2013.01); *G01T 1/2002* (2013.01); *G01T 1/2018* (2013.01)

(58) Field of Classification Search
CPC ..... G01T 1/202; G01T 1/2002; G01T 1/2018; G01T 1/20
See application file for complete search history.

(56) References Cited

U.S. PATENT DOCUMENTS

| 6,720,561 B2 * | 4/2004 | Baumgartner ........ G01T 1/2002 250/370.09 |
| 2002/0021786 A1 * | 2/2002 | Hamamoto .......... H04N 3/1575 378/189 |

(Continued)

FOREIGN PATENT DOCUMENTS

| JP | 2003-262676 A | 9/2003 |
| JP | 2003-279656 A | 10/2003 |

(Continued)

OTHER PUBLICATIONS

International Preliminary Report on Patentability dated Oct. 11, 2018 for PCT/JP2017/002755.

*Primary Examiner* — Kiho Kim
(74) *Attorney, Agent, or Firm* — Drinker Biddle & Reath LLP

(57) ABSTRACT

A radiation detector includes a sensor panel that includes a main surface and a plurality of photoelectric converting elements formed on the main surface, a scintillator layer that includes a plurality of columnar crystals in a scintillator material and is formed on the main surface, an intermediate layer that covers a front surface and a side surface of the scintillator layer, a resin frame that is formed on the main surface to surround the scintillator layer, and a protective plate that is bonded to the resin frame to seal the scintillator layer. The scintillator layer extends along the main surface to come into contact with the resin frame with the intermediate layer interposed therebetween.

11 Claims, 12 Drawing Sheets

(56) References Cited

U.S. PATENT DOCUMENTS

2015/0309189 A1* 10/2015 Hamano ............... G01T 1/2018
                                                                         250/486.1
2017/0254908 A1* 9/2017 Homma .................. G21K 4/00

FOREIGN PATENT DOCUMENTS

| JP | 2004-226313 A | 8/2004 |
|----|---------------|--------|
| JP | 2004-335580 A | 11/2004 |
| JP | 2010-243188 A | 10/2010 |
| JP | 4764407 B2 | 9/2011 |
| JP | 2011-257142 A | 12/2011 |
| JP | 2013-113756 A | 6/2013 |
| WO | WO-2011/108156 A1 | 9/2011 |

* cited by examiner

RADIATION DETECTOR AND SCINTILLATOR PANEL

TECHNICAL FIELD

An aspect of the present invention relates to a radiation detector and a scintillator panel.

BACKGROUND ART

Patent Literature 1 discloses a detector array used in an X-ray imaging system. This detector array has a detector element that is provided on a glass substrate, a scintillator that is constituted of columnar crystals formed on the detector element, and a sheet that is disposed on the scintillator and reflects visible light. The scintillator and the sheet are sealed by a cover fixed to the glass substrate. For example, the cover and the glass substrate are sealed by a metal frame bonded using an epoxy sealant. The metal frame surrounds the scintillator away from the scintillator.

CITATION LIST

Patent Literature

Patent Literature 1: Japanese Unexamined Patent Publication No. 2003-279656

SUMMARY OF INVENTION

Technical Problem

Generally, in a radiation detector having a configuration in which a scintillator layer is surrounded by a frame body, it is desired that an effective region be enlarged by forming the scintillator layer across a range as widely as possible on an inner side of the frame body. However, there is concern that, if the scintillator layer comes into contact with the frame body after the effective region is enlarged, a part around the scintillator layer will deteriorate due to the influence of a solvent included in a bonding agent or the like for fixing the frame body. In this case, an X-ray image, in which the amount of emitted light at a part around the scintillator layer is decreased, is generated.

An object of an aspect of the present invention is to provide a radiation detector and a scintillator, in which an effective region is enlarged and deterioration in a part around a scintillator layer is prevented.

Solution to Problem

According to an embodiment, there is provided a radiation detector including a sensor panel that includes a main surface and a plurality of photoelectric converting elements formed on the main surface, a scintillator layer that includes a plurality of columnar crystals in a scintillator material and is formed on the main surface, an intermediate layer that covers a front surface and a side surface of the scintillator layer, a resin frame that is formed on the main surface to surround the scintillator layer, and a protective plate that is bonded to the resin frame to seal the scintillator layer. The scintillator layer extends along the main surface to come into contact with the resin frame with the intermediate layer interposed therebetween.

In addition, according to another embodiment, there is provided a scintillator panel including a substrate that includes a main surface and has light transmitting properties, a scintillator layer that includes a plurality of columnar crystals in a scintillator material and is formed on the main surface of the substrate, an intermediate layer that covers a front surface and a side surface of the scintillator layer, a resin frame that is formed on the main surface to surround the scintillator layer, and a protective plate that is bonded to the resin frame to seal the scintillator layer. The scintillator layer extends along the main surface to come into contact with the resin frame with the intermediate layer interposed therebetween.

In the radiation detector and the scintillator panel described above, the scintillator layer is sealed by providing the resin frame and the protective plate in the sensor panel or the substrate. The front surface and the side surface of the scintillator layer are covered with the intermediate layer. Then, the scintillator layer extends along the main surface to come into contact with the resin frame with the intermediate layer interposed therebetween. Therefore, compared to a case in which the scintillator layer and the resin frame are disposed away from each other, an effective region is further enlarged. In addition, since the intermediate layer is interposed between contact portions of the scintillator layer and the resin frame, a part around the scintillator layer is prevented from deteriorating due to the influence of a solvent in the resin frame. Therefore, the effective region is enlarged, and a part around the scintillator layer is prevented from deteriorating. An effective region indicates a region in which a scintillator layer is formed on the main surface.

In addition, in the embodiment, a space may be formed between the scintillator layer and the protective plate. According to this configuration, even when a film thickness of the scintillator layer is not uniform, or even when there is warpage in the protective plate, stability of the shape is retained.

In addition, in the embodiment, the intermediate layer may be a light reflection layer or a light absorption layer for scintillation light generated in the scintillator layer. When a function of reflecting light is applied to the intermediate layer, sensitivity for detecting radiation is improved. In addition, when a function of absorbing light is applied to the intermediate layer, resolution in detecting radiation is improved.

In addition, in the embodiment, the protective plate may be formed of a material containing glass, metal, or carbon. Improvement of moisture barrier properties is achieved by using a material containing glass, metal, or carbon.

In addition, in the embodiment, the protective plate may have a frontal surface portion facing the front surface, and a side surface portion facing the side surface. A predetermined distance from the substrate and the like to the protective plate is ensured by having the side surface portion.

In addition, the embodiment may further include a frame member that is made of an inorganic solid material and is disposed to be in contact with the resin frame along an outer circumference of the resin frame. According to this configuration, since the frame member is disposed on an outer side of the resin frame, moisture barrier properties are improved. In addition, since the frame member is disposed between the substrate and the like and the protective plate, stability of the shape is improved.

In addition, in the embodiment, the inorganic solid material may be a glass rod. An inorganic solid material is easily disposed on the outer side of the resin frame by using a glass rod.

Effects of Invention

According to the radiation detector and the scintillator panel of the embodiments, an effective region is enlarged and a part around a scintillator layer is prevented from deteriorating.

DESCRIPTION OF EMBODIMENTS

Hereinafter, aspects of embodiments will be specifically described with reference to the drawings. For convenience, there are cases in which the same reference signs are applied to substantially the same elements and description thereof is omitted. A radiation detector in the following description performs detection by converting radiation, such as X-rays, into scintillation light, such as visible light. For example, such a radiation detector can be used as a radiation imaging device in a mammography apparatus, a chest examination apparatus, a CT apparatus, a dental and oral imaging apparatus, a radiation camera, and the like.

First Embodiment

Figure 1:
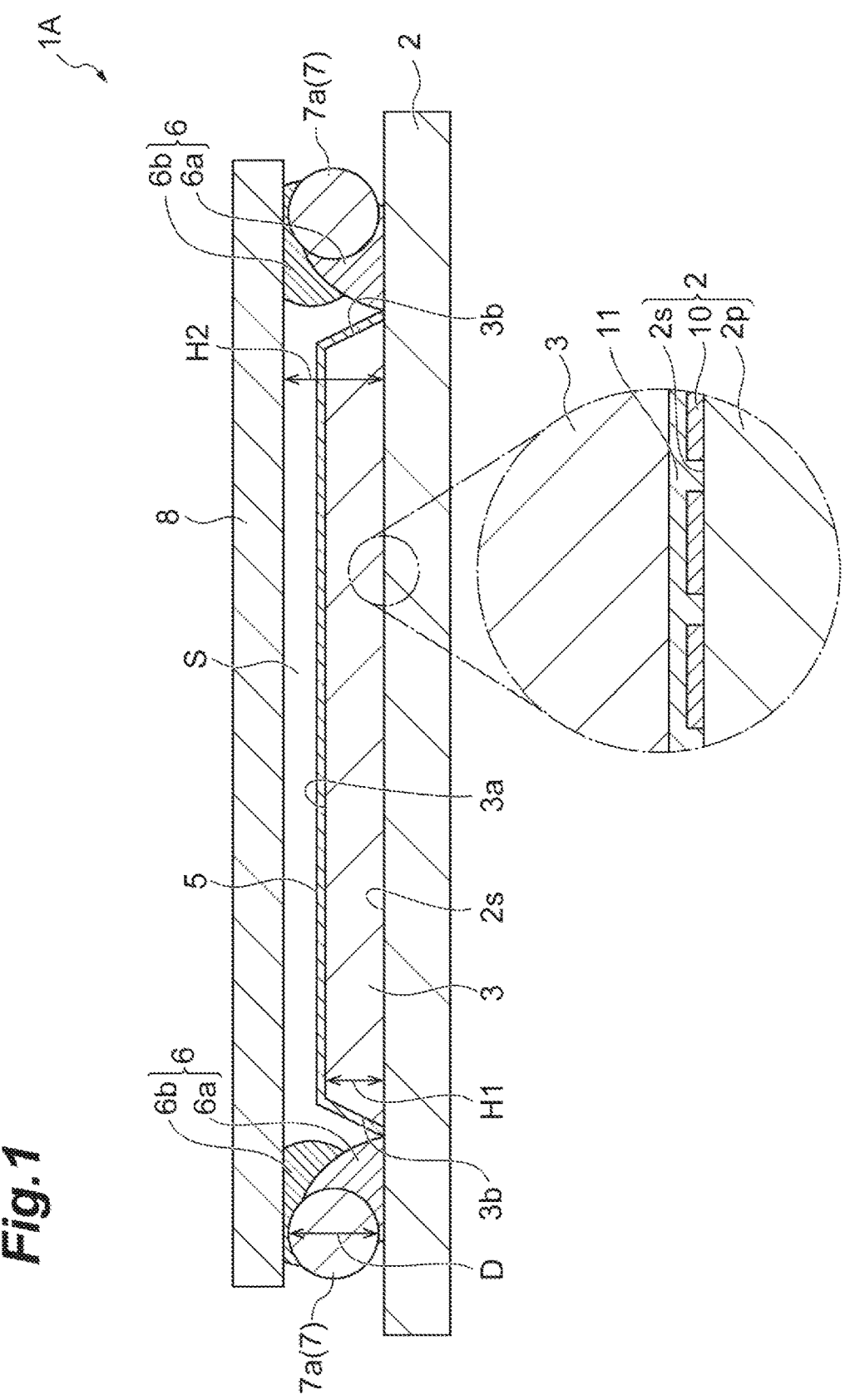
FIG. 1 is a cross-sectional view of a radiation detector according to an embodiment.
Figure 2:
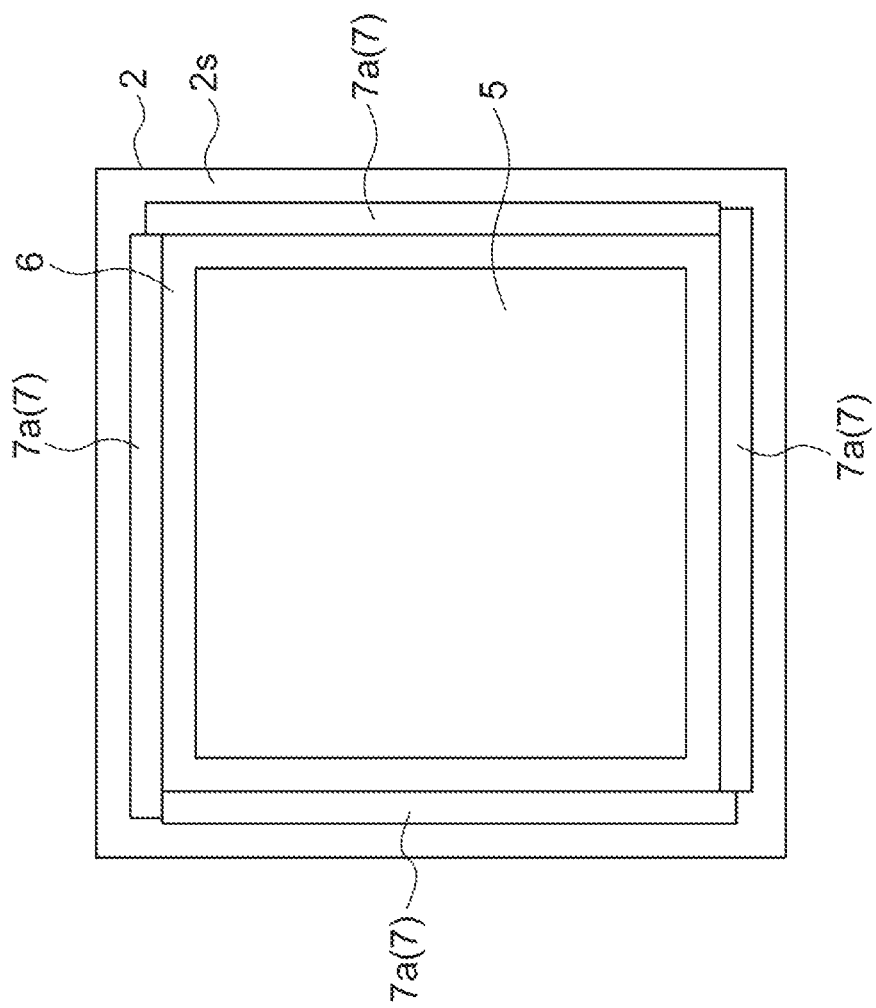
FIG. 2 is a plan view of the radiation detector illustrated in FIG. 1.

FIG. 1 is a cross-sectional view of a radiation detector according to the present embodiment. FIG. 2 is a plan view of the radiation detector illustrated in FIG. 1. In FIG. 2, no protective plate is illustrated. As illustrated in FIGS. 1 and 2, a radiation detector 1A includes a sensor panel 2, a scintillator layer 3, an intermediate layer 5, a resin frame 6, a frame member 7, and a protective plate 8.

The sensor panel 2 has a rectangular plate shape, for example, and has a main surface 2s and a plurality of photoelectric converting elements 10 formed on the main surface 2s. More specifically, the sensor panel 2 has a plate-shaped base portion 2p including the main surface 2s. In addition, the photoelectric converting elements 10 are arranged in a two-dimensional shape along the main surface 2s. A film portion 11 such as a passivation film or a flattened film is formed on the main surface 2s and the photoelectric converting elements 10.

The scintillator layer 3 generates scintillation light such as visible light when radiation, such as X-rays, is incident thereon. The scintillator layer 3 is provided on the main surface 2s and the photoelectric converting elements 10 with the film portion 11 interposed therebetween. The scintillator layer 3 is optically coupled to the photoelectric converting elements 10. Therefore, the photoelectric converting elements 10 input scintillation light generated in the scintillator layer 3 and output an electrical signal corresponding to the scintillation light. The electrical signal is taken out through a wiring (not illustrated) or the like. Accordingly, the radiation detector 1 detects radiation.

The scintillator layer 3 is formed in a rectangular area on the main surface 2s when seen in a direction intersecting (for example, orthogonal to) the main surface 2s, for example. An inclined portion is provided in an outer edge portion of the scintillator layer 3. In the inclined portion, a thickness H1 of the scintillator layer 3 decreases in a direction from the center toward an edge of the scintillator layer 3. Therefore, the scintillator layer 3 has a trapezoidal cross-sectional shape in its entirety, for example. That is, the scintillator layer 3 has a front surface (upper surface) 3a formed along the main surface 2s, and an inclined side surface 3b formed around the front surface 3a.

The thickness H1 of the scintillator layer 3 (thickness excluding the inclined portion described above) is approximately 600 μm, for example. The scintillator layer 3 includes a plurality of columnar crystals in a scintillator material. For example, the scintillator material is a material having CsI (CsI:Tl) as a main component.

The intermediate layer 5 entirely covers the front surface 3a of the scintillator layer 3 and entirely covers the side surface 3b. That is, a circumferential edge of the intermediate layer 5 comes into contact with the main surface 2s of the sensor panel 2, and there is no gap between the circumferential edge of the intermediate layer 5 and the main surface 2s. For example, the intermediate layer 5 prevents a solvent included in ultraviolet curing resin and the like from infiltrating into the scintillator layer 3. In addition, for example, the intermediate layer 5 has optical functions of reflecting and absorbing scintillation light. That is, the intermediate layer 5 serves as a light reflection layer or a light absorption layer for scintillation light generated in the scintillator layer 3.

The resin frame 6 is provided on the main surface 2s to surround the scintillator layer 3 when seen in a direction intersecting the main surface 2s of the sensor panel 2. For example, the resin frame 6 has a rectangularly annular shape. A height H2 of the resin frame 6 from the main surface 2s is greater than a height H1 of the scintillator layer 3 from the main surface 2s. The resin frame 6 is interposed between the main surface 2s and the protective plate 8 and joins the main surface 2s and the protective plate 8 to each other. In the present embodiment, the resin frame 6 is in contact with the intermediate layer 5 covering the scintillator layer 3. More specifically, an outer circumferential edge of the intermediate layer 5 and an inner circumferential edge of the resin frame 6 are in contact with each other. In other words, the scintillator layer 3 extends along the resin frame 6 to be in contact with the resin frame 6 with the intermediate layer 5 interposed therebetween. For example, the resin frame 6 is resin which has low moisture permeability and is constituted of epoxy resin or the like having ultraviolet curing properties.

As illustrated in FIG. 1, the resin frame 6 is formed with a first resin frame 6a and a second resin frame 6b. In the present embodiment, the first resin frame 6a and the second resin frame 6b are formed of similar ultraviolet curing resin. Therefore, in the drawings, the first resin frame 6a and the second resin frame 6b are depicted in a schematically separate manner. However, the first resin frame 6a and the second resin frame 6b are integrated after being cured.

The frame member 7 is mounted on the main surface 2s in a state of being in contact with the resin frame 6 along an outer circumference of the resin frame 6. The frame member 7 is formed of an inorganic solid material. In the present embodiment, the frame member 7 is constituted of four glass rods 7a in which glass is used as a raw material. All of the four glass rods 7a are formed in columnar shapes having a uniform diameter D and have the same shape as one another. The diameter D of the glass rod 7a is greater than the height H1 of the scintillator layer 3 from the main surface 2s, that is, approximately 1 mm, for example. The four glass rods 7a constitute the frame member 7 having a rectangularly annular shape in which an end portion of one glass rod 7a comes into contact with an end portion of another glass rod 7a (refer to FIG. 2). An inner edge side of the frame member 7 is in contact with the resin frame 6 along the outer circumference of the resin frame 6. On the other hand, an outer edge side of the frame member 7 is exposed from the resin frame 6. That is, a portion of the frame member 7 on the inner edge side is buried in the resin frame 6, and the remaining portion of the frame member 7 on the outer edge side is exposed from the resin frame 6.

For example, the protective plate 8 has a rectangularly flat plate shape extending along the main surface 2s. As an example, the size of the protective plate 8 is larger than the size of the frame member 7 and is smaller than the size of the sensor panel 2 in a direction along the main surface 2s. The size of the frame member 7 is a distance between the outer edges of parts facing each other along the main surface 2s in the frame member 7. For example, the thickness of the protective plate 8 ranges approximately from 0.5 mm to 2.0 mm. For example, the protective plate 8 is formed of a material containing glass, metal, or carbon. Examples thereof include a glass plate, an aluminum plate, and a carbon fiber reinforced plastic (CFRP) plate. Radiation is transmitted through the protective plate 8.

The protective plate 8 is bonded to the resin frame 6 in a state of facing the front surface 3a of the scintillator layer 3 covered with the intermediate layer 5. A distance from the main surface 2s of the sensor panel 2 to the protective plate 8 (height H2) is approximately the same as the diameter D of the glass rod. The protective plate 8 is disposed to cover the scintillator layer 3, the intermediate layer 5, the resin frame 6, and the frame member 7 when seen in a direction intersecting the main surface 2s. The protective plate 8, the main surface 2s, and the resin frame 6 form a sealed space in which the scintillator layer 3 and the intermediate layer 5 are disposed. In addition, the scintillator layer 3 and the intermediate layer 5, and the protective plate 8 are disposed away from each other. That is, a space S is formed between the scintillator layer 3 and the intermediate layer 5, and the protective plate 8.

Figure 3:
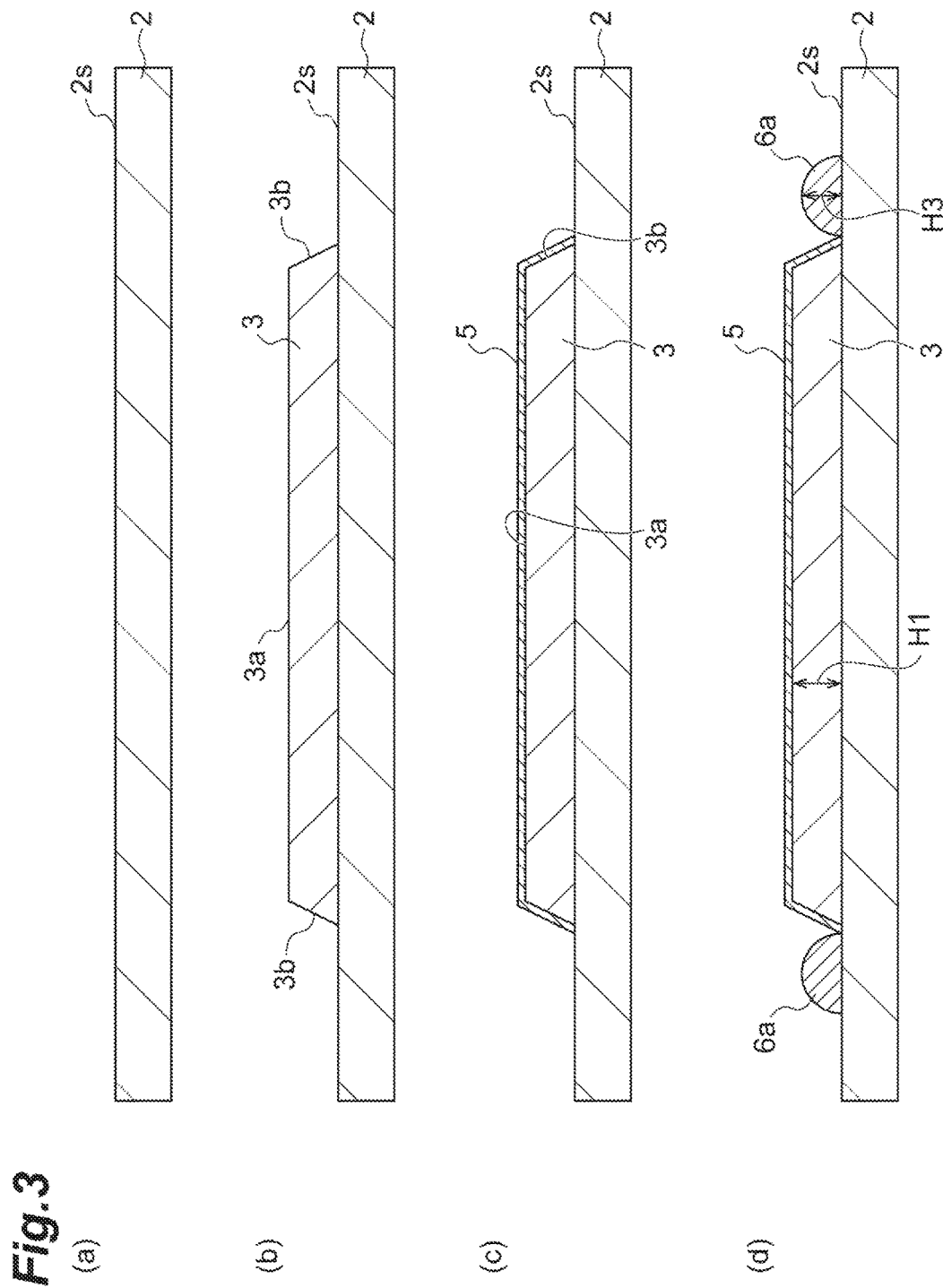
FIG. 3 is a view illustrating a step of manufacturing the radiation detector illustrated in FIG. 1.
Figure 4:
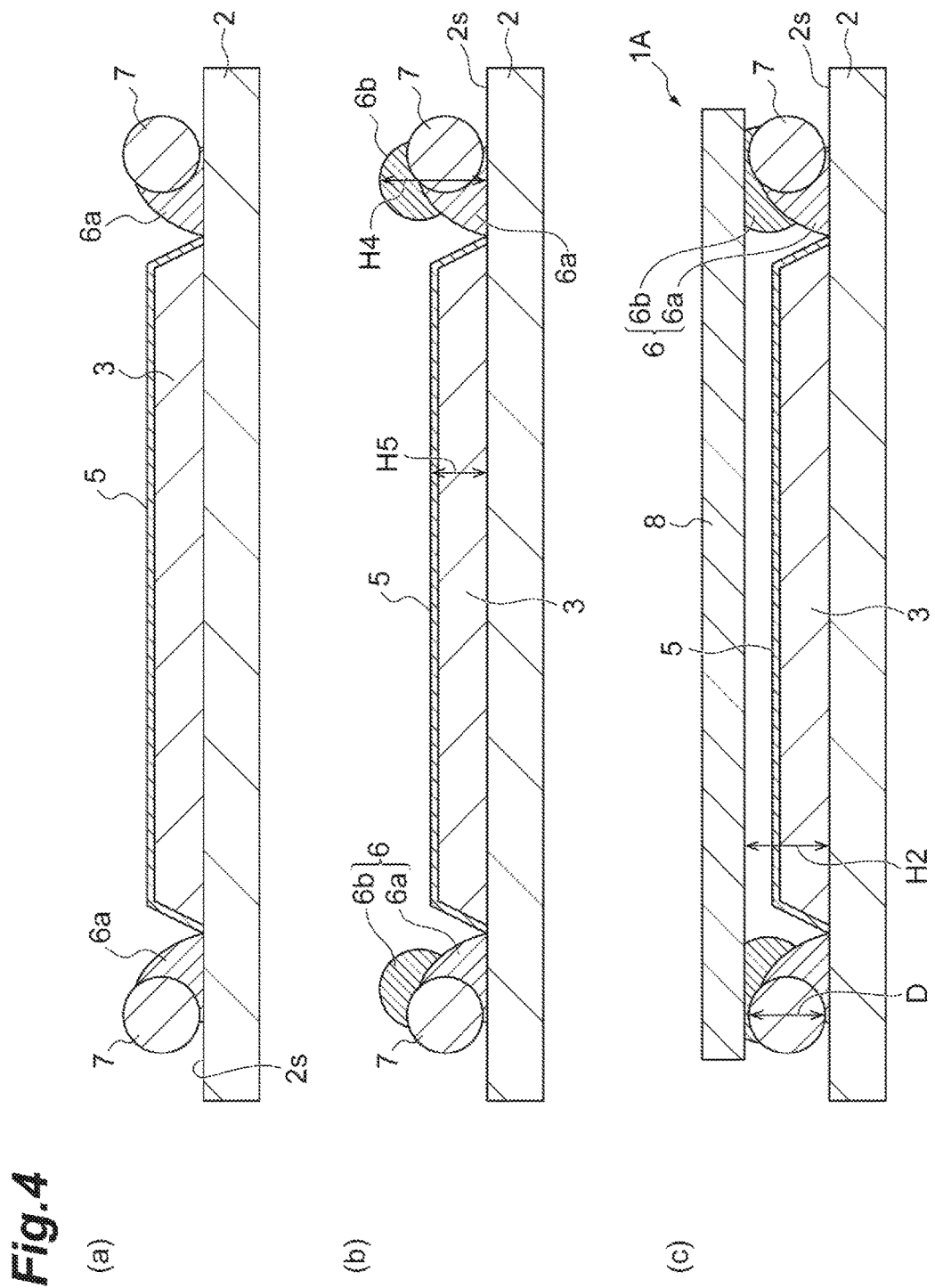
FIG. 4 is a view illustrating the step of manufacturing the radiation detector illustrated in FIG. 1.

Next, a step of manufacturing the radiation detector 1A will be described. FIG. 3 and FIG. 4 are views illustrating a step of manufacturing a radiation detector.

First, the sensor panel 2 in which the plurality of photoelectric converting elements 10 are formed on the main surface 2s is prepared (FIG. 3(a)). Subsequently, as illustrated in FIG. 3(b), the scintillator layer 3 including a plurality of columnar crystals is formed on the main surface 2s of the sensor panel 2 by a vapor phase deposition method. In this step, for example, a material for a fluorescent body (for example, CsI:Tl and CsBr:Eu) is subjected to vacuum deposition on the main surface 2s of the sensor panel 2 such that columnar crystals of the fluorescent body grow on the main surface 2s, thereby forming the scintillator layer 3. Accordingly, a trapezoidal scintillator layer 3 having the front surface 3a and the side surface 3b in a cross-sectional view is formed.

Subsequently, as illustrated in FIG. 3(c), the intermediate layer 5 covers the front surface 3a and the side surface 3b of the scintillator layer 3. Specifically, for example, a coating agent constituted of a pigment and binder resin having optical functions of reflecting and absorbing scintillation light is prepared. Examples of a pigment reflecting scintillation light include white pigments such as titanium dioxide, yttrium oxide, zinc oxide, and aluminum oxide. In addition, examples of a pigment absorbing scintillation light include black pigments such as carbon black and triiron tetraoxide. In addition, examples of binder resin include acrylic organic resin; and urethane, epoxy, fluorine, phenol, polyimide, polyvinyl alcohol, polyethylene, polyester, polycarbonate, and polyurethane-based organic resin. Then, the front surface 3a and the side surface 3b of the scintillator layer 3 are entirely coated with a coating agent to form a resin layer. Subsequently, the resin layer is dried and cured, so that the intermediate layer 5 is produced. After the intermediate layer 5 is produced, the scintillator layer 3 may be activated through baking or the like.

Subsequently, as illustrated in FIG. 3(d), the first resin frame 6a is formed on the main surface 2s to surround the scintillator layer 3. For example, the first resin frame 6a is ultraviolet curing resin such as epoxy resin, acrylic resin, and urethane resin. In this step, in order to make the forming position of the first resin frame 6a closer to the scintillator layer 3, the first resin frame 6a is formed to be in contact with the intermediate layer 5. For example, as in the illustrated example, the first resin frame 6a may be disposed such that the outer circumferential edge of the intermediate layer 5 and the inner circumferential edge of the first resin frame 6a are in contact with each other. A height H3 of the first resin frame 6a to be formed may be determined based on the viscosity of using resin. For example, the height H3 of the first resin frame 6a may be increased to be higher than half the height H1 of the scintillator layer 3.

Subsequently, as illustrated in FIG. 4(a), the frame member 7 is disposed to be in contact with the first resin frame 6a along the outer circumference of the first resin frame 6a. In this step, for example, the glass rods 7a disposed on the main surface 2s are moved from the outer side of the first resin frame 6a toward the first resin frame 6a, so that the glass rods 7a come into contact with the first resin frame 6a. The four glass rods 7a are disposed such that an end portion of a glass rod 7a comes into contact with an end portion of another glass rod 7a, and thus, the frame member 7 having a rectangularly annular shape is formed (refer to FIG. 2). Subsequently, after the frame member 7 is formed, the first resin frame 6a is cured. In the present embodiment, the first resin frame 6a before being cured is irradiated with ultraviolet light, so that the first resin frame 6a is cured. Accordingly, the glass rods 7a are fixed to the first resin frame 6a.

Subsequently, as illustrated in FIG. 4(b), the second resin frame 6b is formed on the first resin frame 6a to surround the scintillator layer 3. In this step, for example, it is possible to use ultraviolet curing resin similar to the ultraviolet curing resin used for forming the first resin frame 6a. Similar to the first resin frame 6a, the second resin frame 6b is formed on the first resin frame 6a to surround the scintillator layer 3. At this time, an end portion of the second resin frame 6b on a side opposite to the main surface 2s is at a position higher than the frame member 7. As in the illustrated example, the second resin frame 6b may be formed on the first resin frame 6a, and the second resin frame 6b may be formed on the glass rods 7a. In addition, in this step, a height H4 of the second resin frame 6b from the main surface 2s is formed to be higher than a height H5 of the intermediate layer 5. An inner circumferential surface of the frame member 7 is covered with the first resin frame 6a and the second resin frame 6b. On the other hand, an outer circumferential surface of the frame member 7 is exposed from the first resin frame 6a and the second resin frame 6b.

Subsequently, as illustrated in FIG. 4(c), the protective plate 8 is bonded to the resin frame 6, so that the scintillator layer 3 and the intermediate layer 5 are sealed. In this step, the protective plate 8 is disposed to be in contact with the whole circumference of the second resin frame 6b before being cured. At this time, the second resin frame 6b is deformed due to the protective plate 8 pressed to the sensor panel 2 side, or the dead weight of the protective plate 8. Accordingly, the distance (height H2) from the main surface 2s of the sensor panel 2 to the protective plate 8 is approximately the same as the height of the frame member (the diameter D of the glass rod). The second resin frame 6b and the protective plate 8 are bonded to each other, so that a space sealed by the main surface 2s, the resin frame 6, and the protective plate 8 is formed.

Subsequently, the second resin frame 6b is cured. In the present embodiment, the second resin frame 6b before being cured is irradiated with ultraviolet light, so that the second resin frame 6b is cured. Accordingly, the protective plate 8 is fixed to the second resin frame 6b. That is, the protective plate 8 is fixed on the main surface 2s with the resin frame 6 interposed therebetween, and then the radiation detector 1A is brought to completion.

In the radiation detector 1A described above, the resin frame 6 and the protective plate 8 are provided with respect to the sensor panel 2, so that the scintillator layer 3 is sealed. The front surface 3a and the side surface 3b of the scintillator layer 3 are covered with the intermediate layer 5. Then, the scintillator layer 3 extends along the main surface 2s to come into contact with the resin frame 6 with the intermediate layer 5 interposed therebetween. Therefore, compared to a case in which the scintillator layer 3 and the resin frame 6 are disposed away from each other, an effective region is further enlarged. That is, the proportion of the scintillator layer 3 on the inner side of the resin frame 6 is increased. In addition, since the intermediate layer 5 is interposed between contact portions of the scintillator layer 3 and the resin frame 6, a part around the scintillator layer 3 is prevented from deteriorating due to the influence of a solvent in the resin frame 6. Therefore, the effective region is enlarged, and a part around the scintillator layer 3 is prevented from deteriorating.

In addition, when the scintillator layer 3 and the resin frame 6 are disposed away from each other, there is a need to form a larger resin frame compared to that in a case in which the scintillator layer 3 is disposed to come into contact with the resin frame 6. In this case, there is concern that significant stress may be applied to the protective plate fixed to the resin frame. In the present embodiment, since no gap is formed between the resin frame 6 and the scintillator layer 3, the size of the resin frame 6 is reduced. Accordingly, stress applied to the protective plate 8 is reduced, and thus, shock resistance is improved.

In addition, the space S is formed between the scintillator layer 3 and the protective plate 8. According to this con-figuration, even when the film thickness of the scintillator layer 3 is not uniform, or even when there is warpage in the protective plate 8, stability of the shape is retained without causing the scintillator layer 3 and the protective plate 8 to interfere with each other.

In addition, the intermediate layer 5 serves as the light reflection layer or the light absorption layer for scintillation light generated in the scintillator layer 3. When a function of reflecting light is applied to the intermediate layer 5, sensitivity for detecting radiation is improved. In addition, when a function of absorbing light is applied to the intermediate layer 5, resolution in detecting radiation is improved.

In addition, the protective plate 8 is formed of a material containing glass, metal, or carbon. In this way, improvement of moisture barrier properties is achieved by using a glass material, a metal material, or a carbon material.

In addition, the embodiment is configured to include the frame member 7 that is made of an inorganic solid material and is disposed to be in contact with the resin frame 6 along the outer circumference of the resin frame 6. According to this configuration, the frame member 7 having no moisture permeability is disposed on the outer side of the resin frame 6, so that moisture barrier properties are improved. In addition, since the frame member 7 is disposed between the sensor panel 2 and the protective plate 8, the frame member 7 functions as a spacer, so that stability of the shape is improved. In addition, since the frame member 7 is formed with the glass rods 7a, the frame member 7 is easily disposed on the outer side of the resin frame 6.

Second Embodiment

A radiation detector 1B according to the present embodiment differs from the radiation detector 1A of the first embodiment in that a scintillator layer having light transmissive properties is formed on a substrate. Hereinafter, configurations different from those of the first embodiment will be mainly described. The same reference signs are applied to the same elements or members, and detailed description will be omitted.

Figure 5:
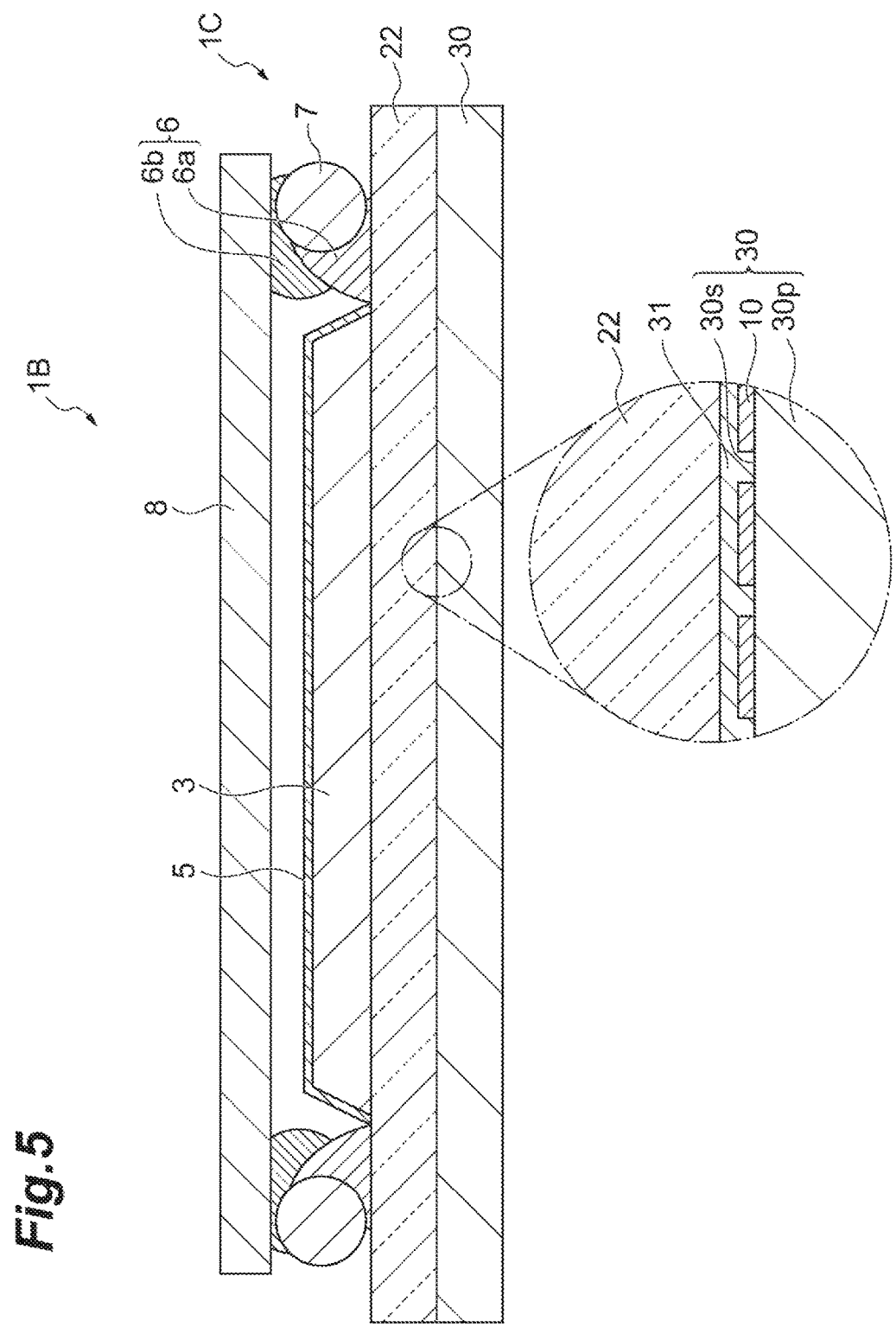
FIG. 5 is a cross-sectional view of a radiation detector according to another embodiment.
Figure 6:
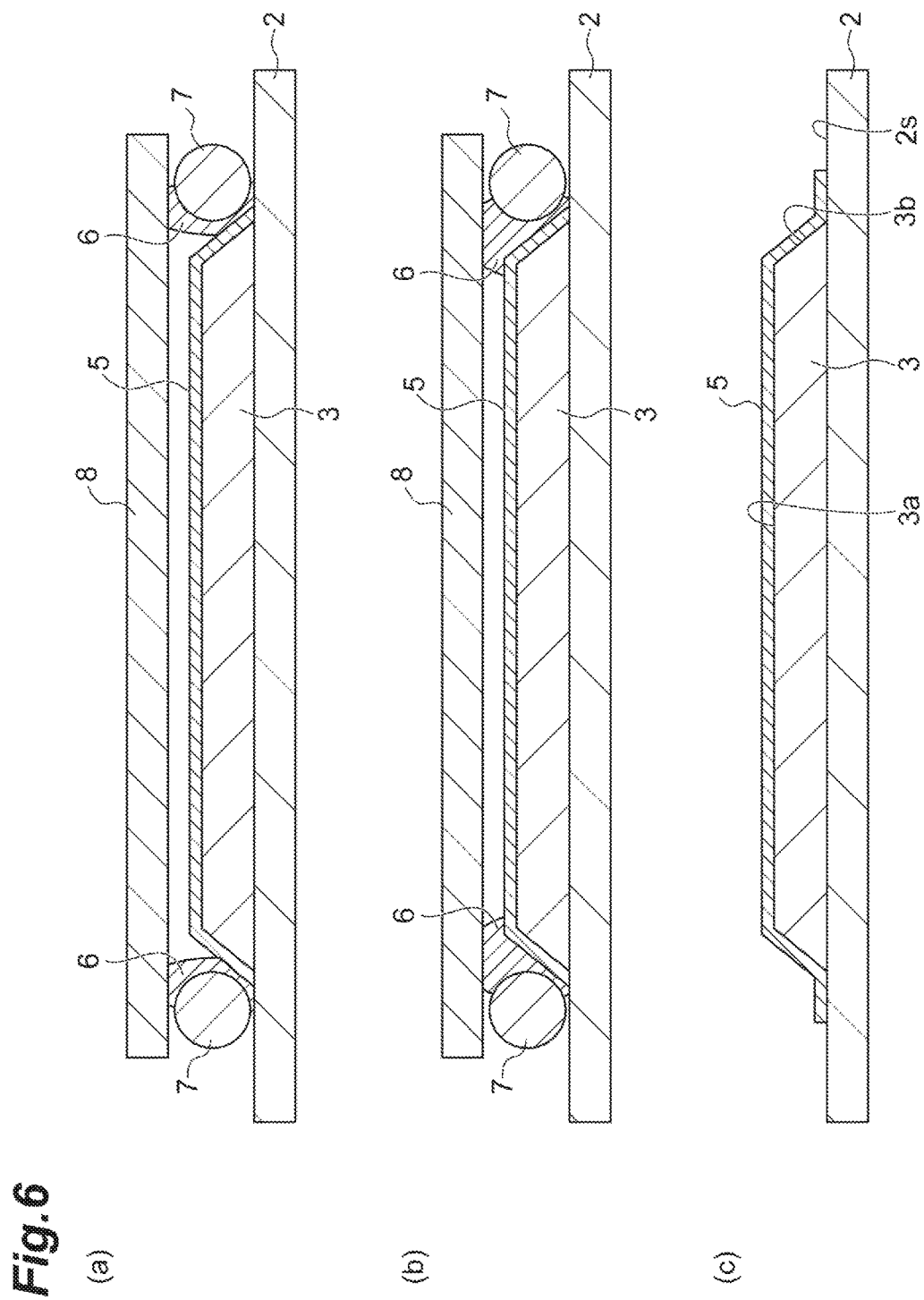
FIG. 6 is a schematic view for describing a radiation detector according a modification example.

As illustrated in FIG. 5, the radiation detector 1B includes a scintillator panel 1C and a sensor panel 30. The scintillator panel 1C includes a substrate 22, the scintillator layer 3, the intermediate layer 5, the resin frame 6, the frame member 7, and the protective plate 8. The substrate 22 has a rectangular plate shape including a main surface 22s and a rear surface 22b on a side opposite to the main surface 22s. The substrate 22 has light transmitting properties with respect to scintillation light generated in the scintillator layer 3. For example, the thickness of the substrate 22 is approximately 2.0 mm. For example, the substrate 22 is constituted of a fiber optic plate (FOP: an optical device constituted of a bundle of a number of optical fibers (for example, J5734 manufactured by HAMAMATSU PHOTONICS K. K.)) or the like.

The scintillator layer 3, the intermediate layer 5, the resin frame 6, the frame member 7, and the protective plate 8 are disposed on the main surface 22s of the substrate 22. Since configurations and manufacturing methods for the scintillator layer 3, the intermediate layer 5, the resin frame 6, the frame member 7, and the protective plate 8 are similar to those of the first embodiment, excluding that they are formed on the main surface 22s of the substrate 22, detailed description will be omitted.

For example, the sensor panel 30 has a rectangular plate shape including a main surface 30s and the plurality of photoelectric converting elements 10 formed on the main surface 30s. More specifically, the sensor panel 30 has a plate-shaped base portion 30p including the main surface 30s. In addition, the photoelectric converting elements 10 are arranged in a two-dimensional shape along the main surface 30s. A film portion 31 such as a passivation film or a flattened film is formed on the main surface 30s and the photoelectric converting elements 10.

The sensor panel 30 is joined to the rear surface 22b of the substrate 22. Accordingly, scintillation light generated in the scintillator layer 3 of the scintillator panel 1C is transmitted through the substrate 22 and is detected by the photoelectric converting elements 10 of the sensor panel 30. In this way, in the present embodiment, the radiation detector 1B has a configuration in which the sensor panel 30 is joined to the scintillator panel 1C. Even in the radiation detector 1B having such a configuration, it is possible to exhibit operational effects similar to those of the radiation detector 1A in the first embodiment.

Hereinabove, the embodiments according to the aspects of the present invention have been described in detail with reference to the drawings. However, their specific configurations are not limited to these embodiments. For example, the disposing location, the shape, and the like of each of the elements in the first embodiment and the second embodiment are merely examples and are not limited thereto. Hereinafter, each of modification examples according to the embodiments of the present invention will be described mainly in regard to configurations different from those of the embodiments described above. The same reference signs are applied to the same elements or members, and detailed description will be omitted. In FIG. 6 to FIG. 9 referred to in the following description, even when the resin frame 6 is formed with the first resin frame 6a and the second resin frame 6b, there are cases in which the first resin frame 6a and the second resin frame 6b are depicted as the integrated resin frame 6.

FIGS. 6(a) and 6(b) are cross-sectional views illustrating modification examples in which the resin frame is disposed at a different position. Each of the embodiments described above has illustrated an example in which the resin frame 6 is fainted such that the inner edge of the resin frame 6 and the outer edge of the intermediate layer 5 are in contact with each other. However, the embodiments are not limited thereto. As illustrated in FIG. 6(a), the resin frame 6 may be disposed to be in contact with inclined surfaces of the scintillator layer 3 and the intermediate layer 5. In addition, as illustrated in FIG. 6(b), the resin frame 6 may be disposed to be in contact with the upper surfaces of the scintillator layer 3 and the intermediate layer 5. In the example illustrated in FIGS. 6(a) and 6(b), the proportion of the scintillator layer 3 on the inner side of the resin frame 6 is further increased.

FIG. 6(e) is a cross-sectional view illustrating a modification example regarding the shape of the intermediate layer 5. In FIG. 6(c), the resin frame 6, the frame member 7, and the protective plate 8 are omitted. The disposing locations and the like of the resin frame 6, the frame member 7, and the protective plate 8 may employ the configuration of each of the embodiments and each of the modification examples. As illustrated in FIG. 6(c), the intermediate layer 5 may extend not only to the front surface 3a and the side surface 3b of the scintillator layer 3 but also to a part around the scintillator layer 3 on the main surface 2s of the sensor panel 2. In this case, the scintillator layer 3 is more reliably covered with the intermediate layer 5.

Figure 7:
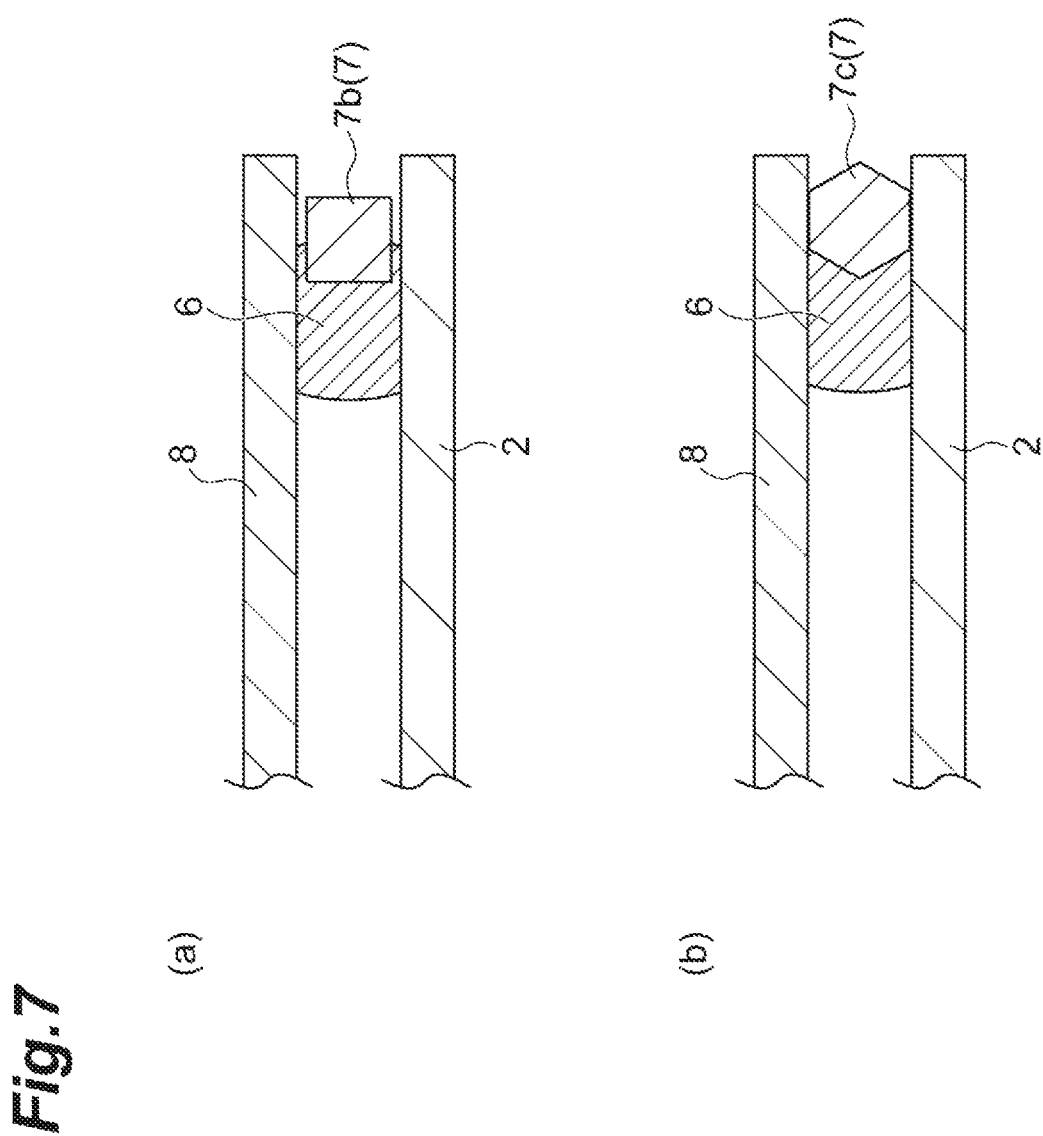
FIG. 7 is a schematic view for describing a radiation detector according a modification example.
Figure 8:
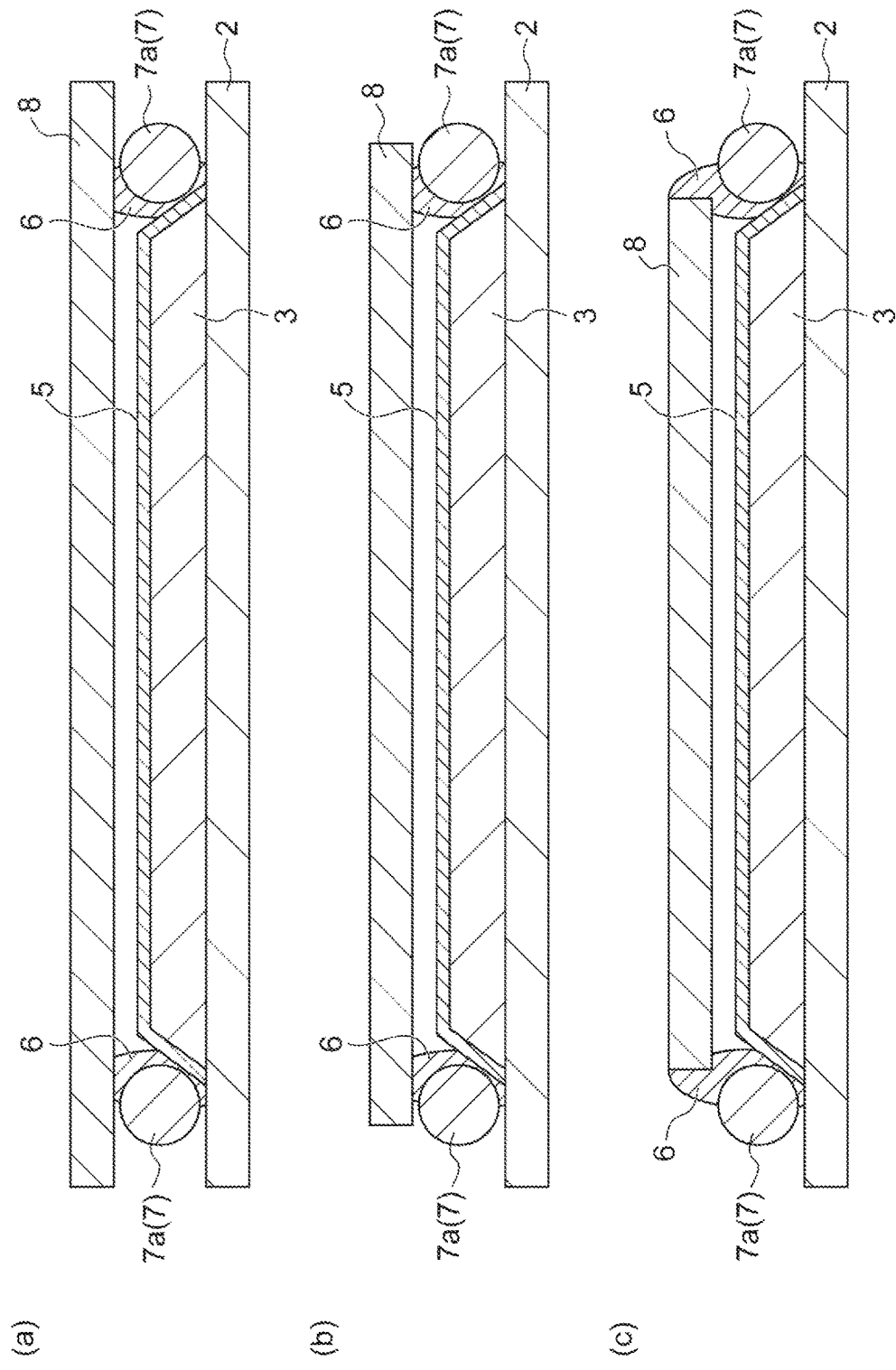
FIG. 8 is a schematic view for describing a radiation detector according a modification example.

FIGS. 7(a) and 7(b) are cross-sectional views illustrating modification examples regarding the shape of the frame member. In FIG. 7, only a part in the vicinity of the resin frame is illustrated, and the scintillator layer and the intermediate layer are omitted. As illustrated in FIG. 7(a), the shape of a glass rod 7b constituting the frame member 7 may be a quadrangular prism shape. In addition, as illustrated in FIG. 7(b), the shape of a glass rod 7c constituting the frame member 7 may be a hexagonal prism shape. Since the glass rods 7b and 7c having a prism shape are unlikely to roll, positioning of the glass rods 7b and 7e can be easily performed. In addition, since the bottom surface and the upper surface of the glass rods 7b and 7c can come into surface contact with the sensor panel 2 and the protective plate 8, stability of the shape is easily retained.

FIGS. 8(a) to 8(c) are cross-sectional views illustrating modification examples in which the protective plate has a different size. The embodiments described above have illustrated an example of the protective plate 8 which is larger than the frame member 7 and is smaller than the sensor panel 2. However, the embodiments are not limited thereto. For example, as illustrated in FIG. 8(a), the protective plate 8 may have substantially the same size as the size of the sensor panel 2 in a direction along the main surface 2s. In addition, as illustrated in FIG. 8(b), the protective plate 8 may be smaller than the outer edge of the frame member 7 and may be larger than the inner edge of the frame member 7 in a direction along the main surface 2s. In this example, the protective plate 8 extends to the outer side from the center of the glass rods 7a. In addition, as illustrated in FIG. 8(c), the protective plate 8 may have substantially the same size as that of the inner edge of the frame member 7 in a direction along the main surface 2s. In this case, the resin frame 6 extends to the outer side from the protective plate 8.

Figure 9:
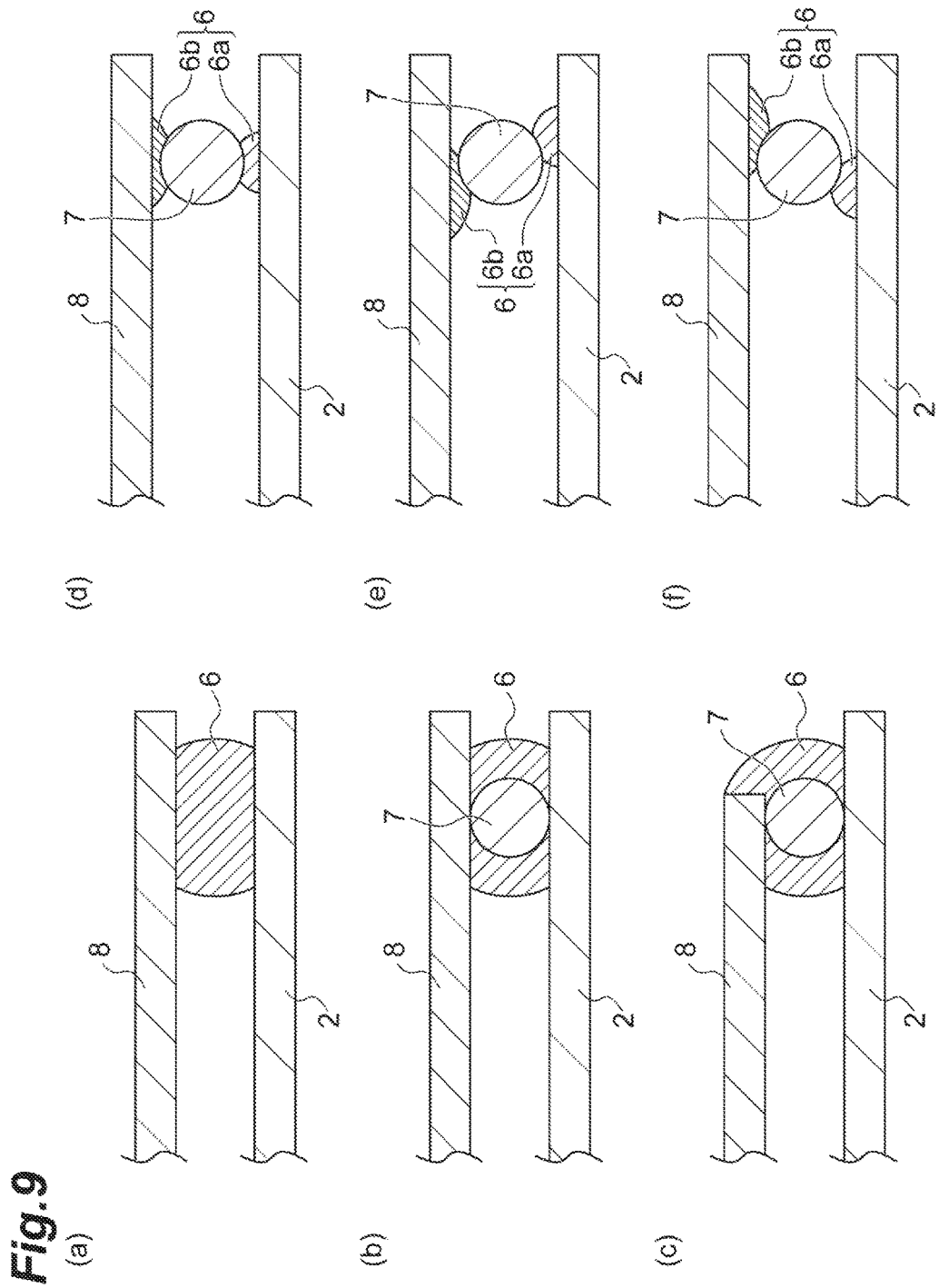
FIG. 9 is a schematic view for describing a radiation detector according a modification example.

FIGS. 9(a) to 9(f) are cross-sectional views illustrating modification examples regarding the disposing locations of the resin frame and the frame member. In FIG. 9, only a part in the vicinity of the resin frame 6 is illustrated, and the scintillator layer and the intermediate layer are omitted. As illustrated in FIG. 9, the protective plate 8 may be supported by only the resin frame 6 without having the frame member 7 disposed therein. In addition, as illustrated in FIG. 9(b), the resin frame 6 may be formed not only at the inner edge of the frame member 7 but also at the outer edge of the frame member 7. That is, the frame member 7 in its entirety may be buried in the resin frame 6. In this case, as illustrated in FIG. 9(c), the size of the protective plate 8 may be approximately the same as the size of the frame member 7. In addition, as illustrated in FIG. 9(d), the first resin frame 6a may be disposed between the frame member 7 and the main surface 2s, and the second resin frame 6b may be disposed between the frame member 7 and the protective plate 8. In this case, as illustrated in FIG. 9(e), the second resin frame 6b may be disposed on an inner side with respect to the first resin frame 6a. In addition, as illustrated in FIG. 9(f), the second resin frame 6b may be disposed on an outer side with respect to the first resin frame 6a.

Figure 10:
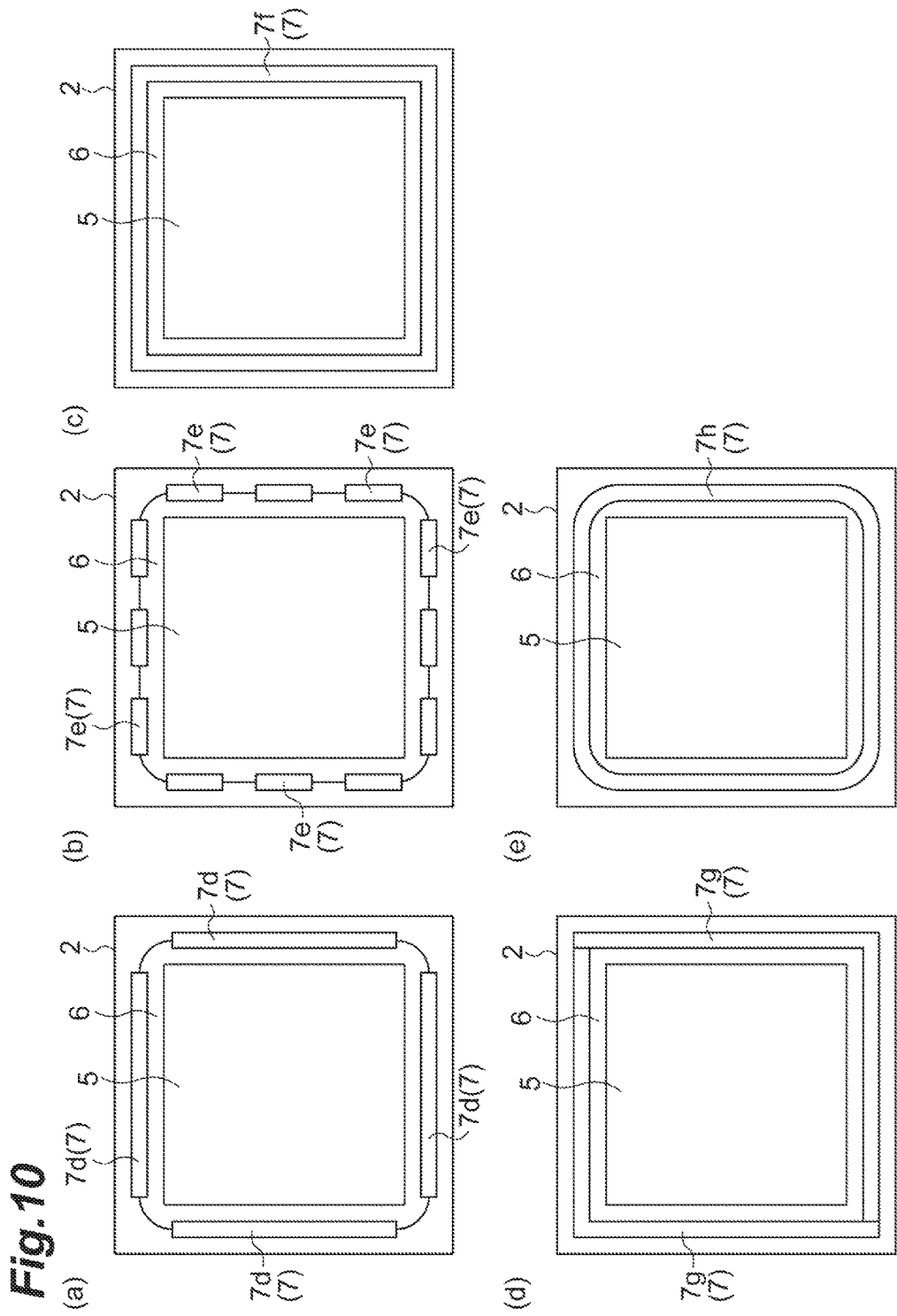
FIG. 10 is a schematic view for describing a radiation detector according a modification example.

FIGS. 10(a) to 10(e) are plan views of modification examples regarding the form of the frame member. In FIG. 10, the protective plate is omitted in the illustration. As illustrated in FIG. 10(a), in place of the glass rods 7a, the frame member 7 may be formed with glass rods 7d shorter than the glass rods 7a. For example, the lengths of the glass rods 7d are approximately the same as the length of one side of the intermediate layer 5 along the main surface 2s, and the lengths are approximately the same as the length of one side of the scintillator layer along the main surface 2s. In this modification example, four glass rods 7d are disposed away from each other, so that the frame member 7 having a rectangularly annular shape with no corner portions is formed. As illustrated in FIG. 10(b), in place of the glass rods 7a, the frame member 7 may be formed with glass rods 7e shorter than the glass rods 7d. For example, the lengths of the glass rods 7e may be approximately ⅓ of one side of the intermediate layer 5 along the main surface 2s. In this modification example, nine glass rods 7e are annularly disposed away from each other, so that the frame member 7 having a rectangularly annular shape is formed. One side of the frame member 7 having a rectangularly annular shape is formed with three glass rods 7e. As illustrated in FIGS. 10(a) and 10(b), the glass rods 7d and 7e constituting the frame member 7 may be away from each other.

In addition, as illustrated in FIG. 10(c), in place of the four glass rods 7a, a single glass rod 7f formed in a rectangular frame shape may be used as the frame member 7. In addition, as illustrated in FIG. 10(d), in place of the glass rods 7a, the frame member 7 may be formed with a pair of glass rods 7g formed in an L-shape. In this modification example, two glass rods 7g are disposed in a rectangular frame shape, so that the frame member 7 is formed. In addition, as illustrated in FIG. 10(e), in place of the four glass rods 7a, a single glass rod 7h having a rectangularly annular shape with curved corner portions may be used as the frame member 7.

Figure 11:
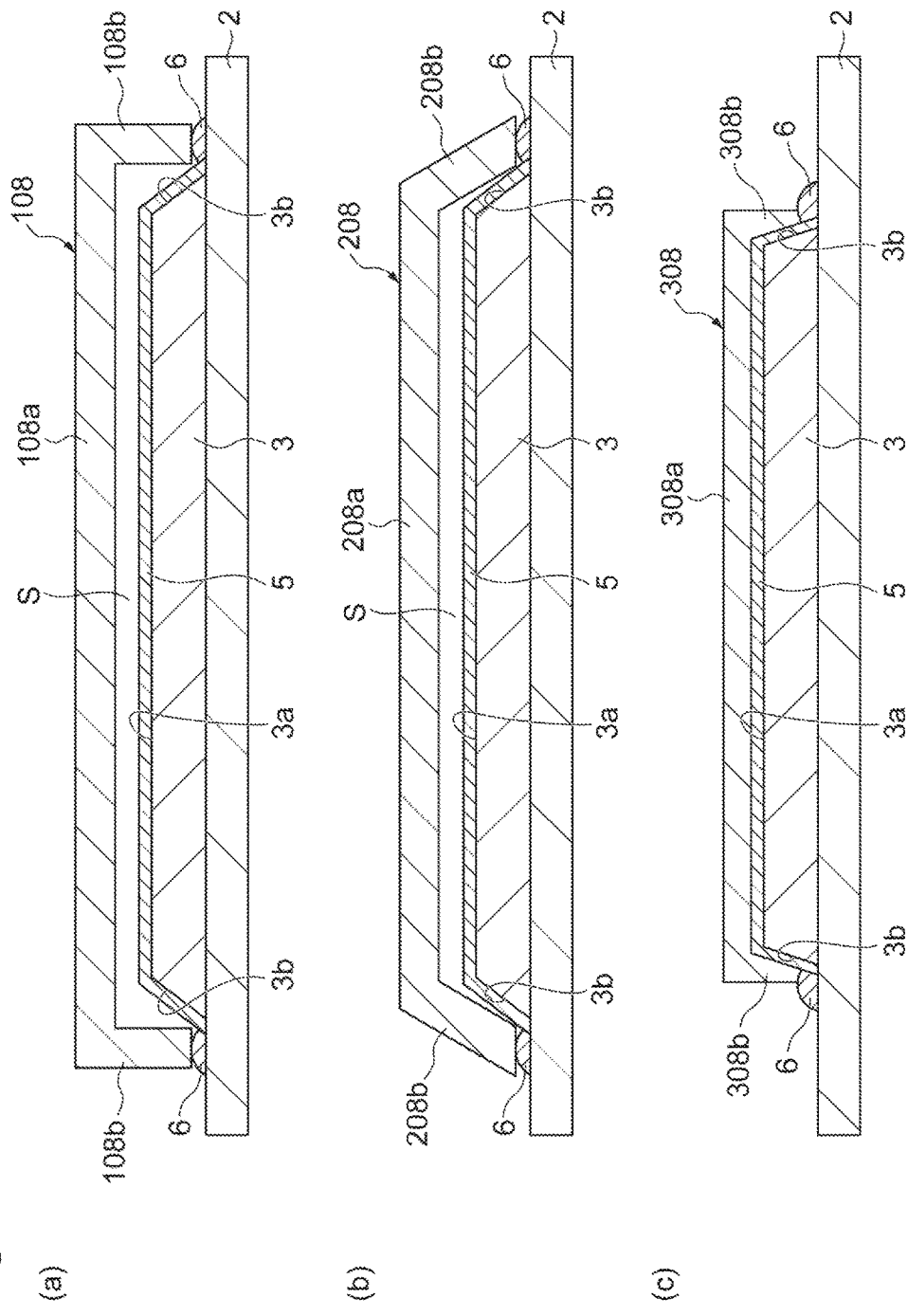
FIG. 11 is a schematic view for describing a radiation detector according a modification example.

FIGS. 11(a) to 11(c) are cross-sectional views illustrating modification examples in which the protective plate has a different atm. As illustrated in FIG. 11(a), in place of the protective plate 8, a protective plate 108 may be provided. The protective plate 108 has a frontal surface portion 108a facing the front surface 3a of the scintillator layer 3, and a side surface portion 108b facing the side surface 3b. Accordingly, the protective plate 108 is disposed along the shape of the scintillator layer 3 having a trapezoidal shape. The frontal surface portion 108a and the side surface portion 108b are orthogonal to each other. The end portion of the side surface portion 108b on the 2s side is fixed to the resin frame 6. As illustrated in FIG. 11(b), in place of the protective plate 8, a protective plate 208 may be provided. The protective plate 208 has a frontal surface portion 208a facing the front surface 3a of the scintillator layer 3, and a side surface portion 208b facing the side surface 3b. The side surface portion 208b is inclined to be widened outward progressively away from the frontal surface portion 208a. Accordingly, the protective plate 208 is disposed along the shape the scintillator layer 3 having a trapezoidal shape. The end portion of the side surface portion 208b on the 2s side is fixed to the resin frame 6. As illustrated in FIGS. 11(a) and 11(b), in these modification examples, it is possible to ensure the distance corresponding to the heights of the side surface portions 108b and 208b from the sensor panel 2 to the protective plates 108 and 208, by having the side surface portions 108b and 208b.

In addition, as illustrated in FIG. 11(c), in place of the protective plate 8, a protective sheet 308 may be provided. For example, the protective sheet 308 is formed with a sheet having flexibility and moisture barrier properties. The protective sheet 308 comes into contact with the intermediate layer 5 and covers the intermediate layer 5. That is, the protective sheet 308 has a frontal surface portion 308a facing the front surface 3a of the scintillator layer 3, and a side surface portion 308b facing the side surface 3b. Accordingly, the protective sheet 308 is disposed along the shape of the scintillator layer 3 having a trapezoidal shape. The end portion of the side surface portion 308b on the main surface 2s side is fixed to the resin frame 6.

In addition, the embodiments described above have illustrated an example of a protective plate having a flat plate shape. However, for example, a protective plate having a flat plate shape with bending may be used. In this case, the protective plate may have a bent shape such that the distance from the main surface to the central part of the protective plate becomes greater than the distance from the main surface to the surrounding part of the protective plate. In addition, the protective plate may have a bent shape such that the distance from the main surface to the central part of the protective plate becomes smaller than the distance from the main surface to the surrounding part of the protective plate.

In addition, an example in which the frame member is formed of a glass material has been illustrated. However, the configuration is not limited thereto. For example, the frame member may be formed of a metal material such as aluminum. In each of the embodiments described above, glass rods are used as the frame member. In this case, ultraviolet light is transmitted through the glass rods, so that ultraviolet curing resin forming the resin frame is efficiently irradiated with ultraviolet light.

In addition, an example of ultraviolet curing resin has been illustrated as a resin material forming the resin frame. However, the configuration is not limited thereto. For example, the resin frame may be fainted of thermosetting resin. In addition, the first resin frame and the second resin frame may be formed of materials different from each other.

In addition, an example in which a space is formed between the scintillator layer and the intermediate layer, and the protective plate has been illustrated. However, for example, the space may be filled with a filler made of an elastic material.

In addition, each of the embodiments and the modification examples can mutually employ the configuration of one another. For example, in the modification examples illustrated in FIG. 8, FIG. 9, and the like, in place of the glass rods 7a, the configurations of the glass rods 7b and 7c may be employed.

Experimental Example

Figure 12:
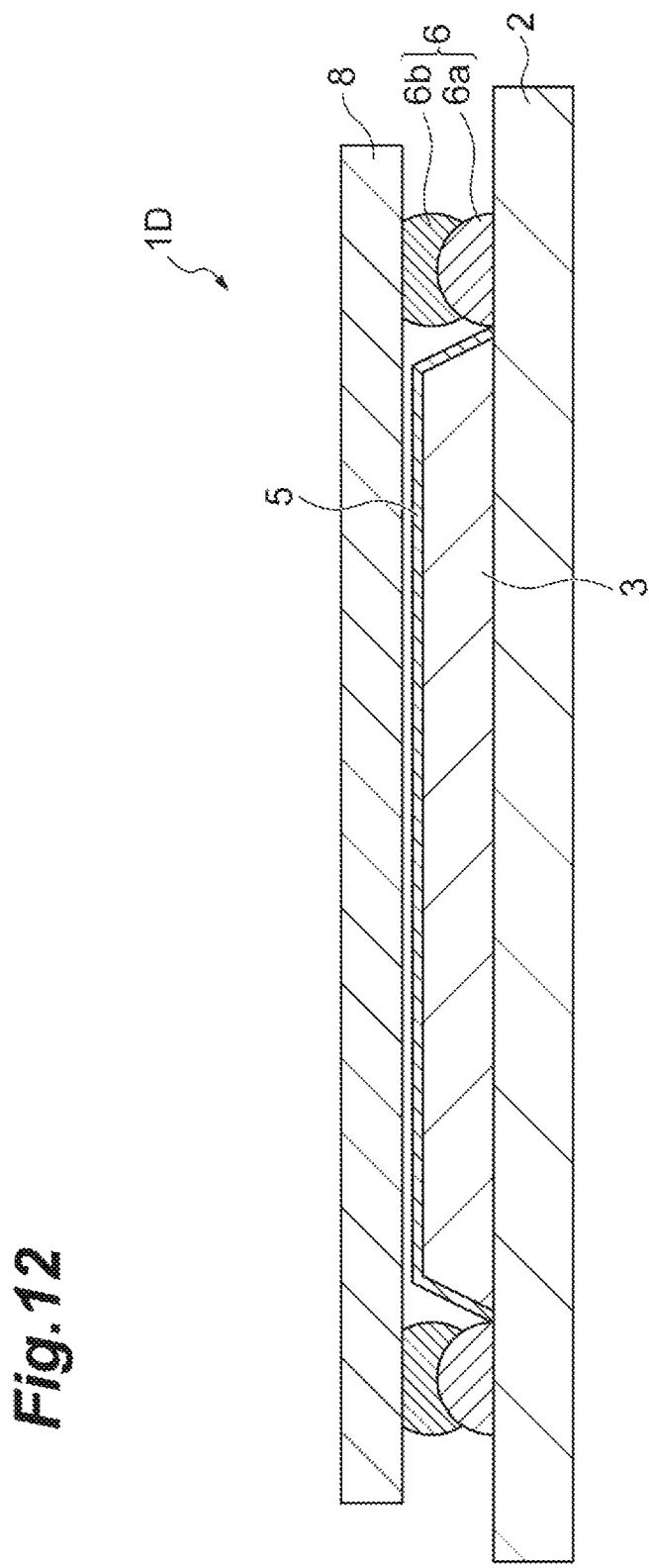
FIG. 12 is a cross-sectional view illustrating a radiation detector including no glass rod.

FIG. 12 is a cross-sectional view illustrating a radiation detector 1D including no glass rod. The radiation detector 1D includes the sensor panel 2, the scintillator layer 3, the intermediate layer 5, the resin frame 6, and the protective plate 8. The radiation detector 1D differs from the radiation detector 1A of the first embodiment only in that the frame member 7 is not included. In this experimental example, an experiment was performed regarding moisture barrier performance that varied depending on the presence or absence of the frame member 7, with a radiation detector 1A having the frame member 7 and a radiation detector 1D having no frame member 7 used as samples. In the experiment, each of the samples was disposed inside a thermostatic chamber in which the temperature was set to 50° C. and the relative humidity was adjusted to 90%, and changes in X-ray characteristics (the resolution and the amount of emitted light) were measured. Table 1 shows measurement results of the resolution. In addition, Table 2 shows measurement results of the amount of emitted light.

TABLE 1

| | | \multicolumn{11}{c|}{Time (hour)} |
| | | 0 | 27 | 48 | 96 | 164 | 260 | 332 | 428 | 596 | 832 | 1168 |
|---|---|---|---|---|---|---|---|---|---|---|---|---|
| Frame member | Absent | 100% | 101% | 100% | 99% | 99% | 94% | 90% | 80% | 64% | 42% | — |
| | Present | 100% | 99% | 100% | 98% | 99% | 100% | 99% | 98% | 99% | 98% | 97% |

TABLE 2

| | | \multicolumn{11}{c|}{Time (hour)} |
| | | 0 | 27 | 48 | 96 | 164 | 260 | 332 | 428 | 596 | 832 | 1168 |
|---|---|---|---|---|---|---|---|---|---|---|---|---|
| Frame member | Absent | 100% | 99% | 99% | 99% | 97% | 92% | 88% | 85% | 78% | 80% | — |
| | Present | 100% | 99% | 99% | 100% | 100% | 98% | 98% | 99% | 96% | 97% | 95% |

Table 1 shows relative values of a contrast transfer function (CTF: resolution) with the lapse of each time, when the CTF in an initial stage is 100%. In addition, Table 2 shows relative values of the amount of emitted light with the lapse of each time, when the amount of emitted light of the scintillator layer in the initial stage is 100%. From both the results, when a frame member was included, no significant deterioration was observed in the performance of the radiation detector, compared to the case in which no frame member was included.

INDUSTRIAL APPLICABILITY

According to a radiation detector and a scintillator panel of an embodiment, an effective region is enlarged and a part around a scintillator layer is prevented from deteriorating.

REFERENCE SIGNS LIST 1A, 1B, 1D Radiation detector
1C Scintillator panel
2, 30 Sensor panel
3 Scintillator layer
5 Intermediate layer
6 Resin frame
6a First resin frame
6b Second resin frame
7 Frame member
7a Glass rod
8 Protective plate

The invention claimed is:

1. A radiation detector comprising:
a sensor panel that includes a main surface and a plurality of photoelectric converting elements formed on the main surface;
a scintillator layer that includes a plurality of columnar crystals in a scintillator material and is formed on the main surface;
an intermediate layer that covers a front surface and a side surface of the scintillator layer;
a resin frame that is formed on the main surface to surround the scintillator layer; and
a protective plate that is bonded to the resin frame to seal the scintillator layer,
wherein the scintillator layer extends along the main surface to the resin frame with the intermediate layer interposed between the scintillator layer and the resin frame, and with the intermediate layer contacting the resin frame,
wherein the intermediate layer is formed from dry curing a resin layer containing a light-reflective or light-absorbing pigment, and
wherein a space is formed between the intermediate layer and the protective plate.

2. The radiation detector according to claim 1, wherein the protective plate is formed of a material containing glass, metal, or carbon.

3. The radiation detector according to claim 1, wherein the protective plate has a frontal surface portion facing the front surface, and a side surface portion facing the side surface.

4. The radiation detector according to claim 1, further comprising:
a frame member that is made of an inorganic solid material and is disposed to be in contact with the resin frame along an outer circumference of the resin frame.

5. The radiation detector according to claim 4, wherein the frame member is a glass rod.

6. A scintillator panel comprising:
a substrate that includes a main surface and has light transmitting properties;
a scintillator layer that includes a plurality of columnar crystals in a scintillator material and is formed on the main surface;
an intermediate layer that covers a front surface and a side surface of the scintillator layer;
a resin frame that is formed on the main surface to surround the scintillator layer; and
a protective plate that is bonded to the resin frame to seal the scintillator layer,
wherein the scintillator layer extends along the main surface to the resin frame with the intermediate layer interposed between the scintillator layer and the resin frame, and with the intermediate layer contacting the resin frame,
wherein the intermediate layer is formed from dry curing a resin layer containing a light-reflective or light-absorbing pigment, and
wherein a space is formed between the intermediate layer and the protective plate.

7. The scintillator panel according to claim 6, wherein the protective plate is formed of a material containing glass, metal, or carbon.

8. The scintillator panel according to claim 6,
wherein the protective plate has a frontal surface portion facing the front surface, and a side surface portion facing the side surface.

9. The scintillator panel according to claim 6, further comprising:
a frame member that is made of an inorganic solid material and is disposed to be in contact with the resin frame along an outer circumference of the resin frame.

10. The scintillator panel according to claim 9,
wherein the frame member is a glass rod.

11. A radiation detector comprising:
the scintillator panel according to claim 6; and
a sensor panel that includes a plurality of photoelectric converting elements and is joined to a surface on a side opposite to the main surface of the substrate.

* * * * *